(12) United States Patent
Rodrigues et al.

(10) Patent No.: US 7,896,260 B2
(45) Date of Patent: Mar. 1, 2011

(54) TWO-STAGE FUEL INJECTOR

(75) Inventors: José Roland Rodrigues, Nandy (FR); Alain Tiepel, Bombon (FR)

(73) Assignee: Snecma, Paris (FR)

( * ) Notice: Subject to any disclaimer, the term of this patent is extended or adjusted under 35 U.S.C. 154(b) by 414 days.

(21) Appl. No.: 12/016,480

(22) Filed: Jan. 18, 2008

(65) Prior Publication Data

US 2009/0173810 A1   Jul. 9, 2009

(30) Foreign Application Priority Data

Jan. 22, 2007   (FR) ................... 07 52804

(51) Int. Cl.
  F02M 47/02 (2006.01)
  F02M 39/00 (2006.01)
  F02M 61/08 (2006.01)
  F02M 61/20 (2006.01)
  F02C 1/00 (2006.01)

(52) U.S. Cl. ................ 239/533.9; 239/88; 239/91; 239/533.3; 239/533.7; 239/533.11; 60/740

(58) Field of Classification Search ............ 239/88, 239/91, 95, 533.2, 533.3, 533.7, 533.9, 533.11; 137/115.13, 115.14, 118.06, 512.2, 512.3, 137/541, 506; 60/740, 746
See application file for complete search history.

(56) References Cited

U.S. PATENT DOCUMENTS

| 3,662,959 A | | 5/1972 | Sample, Jr. |
| 4,938,418 A | * | 7/1990 | Halvorsen .................. 239/5 |
| 6,644,031 B2 | * | 11/2003 | Lavie et al. ................ 60/740 |
| 6,758,043 B2 | * | 7/2004 | Michau et al. ............. 60/740 |
| 2003/0093998 A1 | | 5/2003 | Michau et al. |

FOREIGN PATENT DOCUMENTS

| FR | 2 832 492 A1 | 5/2003 |
| GB | 2 134 244 A | 8/1984 |

* cited by examiner

*Primary Examiner*—Len Tran
*Assistant Examiner*—Ryan Reis
(74) *Attorney, Agent, or Firm*—Oblon, Spivak, McClelland, Maier & Neustadt, L.L.P.

(57) ABSTRACT

This injector with two valves (7, 10) which open at different fuel pressures so as to establish a primary flow regime and then a secondary flow regime is characterized in that the primary regime is enriched with fuel via an orifice (21) which adds a branch to the primary flow path of the fuel, but which is closed when the secondary valve is displaced so as to prevent enrichment of the fuel in the secondary regime. This invention applies in particular to certain aircraft engines.

6 Claims, 1 Drawing Sheet

TWO-STAGE FUEL INJECTOR

BACKGROUND OF THE INVENTION

1. Field of the Invention

The present invention relates to a two-stage fuel injector equipping the combustion chambers of gas turbines.

2. Discussion of the Background

It improves devices such as that described in French patent 2 832 492, the structure and operation of which can be summarized as follows. Two valves are arranged in series in an outer bushing of the injector and are biased separately into closed positions by respective springs. The fuel fed into the injector by a pump passes through a filter and weighs on the first valve, which is a primary valve biased by a weak spring. A moderate pressure is therefore enough to open said valve, and the fuel passes through it and then flows along a primary path which leads it out of the injector. The primary path comprises an annular portion between the outer bushing and an inner body, in which the other valve or secondary valve is housed in a sliding manner. The fuel also weighs on the secondary valve, which is biased by a much stronger spring than the previous spring. It therefore does not move until a pressure is reached which is greater than that necessary to displace the primary valve and to open the primary fuel path, but once it too has been opened it opens up a secondary fuel path which branches from the primary fuel path and passes through the secondary valve. The flow of fuel delivered by the injector is then increased by the additional flow which flows through this secondary fuel path. This secondary flow is used in certain regimes of the engine in which the injector is employed.

The idea here is to enrich the mixture delivered by the injector, i.e. to increase the fuel flow, but only in the primary flow regime. This enrichment might be required in order to improve the ignition capacity during high-altitude flight and also on the ground. It will concern only some of the injectors of the engine. The temptation will therefore be to modify existing injectors instead of using a completely new design or a different model. It will in particular be advantageous if the injector sought is identical to the existing injector with regard to the parts governing the secondary flow.

SUMMARY OF THE INVENTION

According to the invention, this is achieved by means of a two-stage fuel injector comprising two valves arranged in series and biased towards closed positions, namely a primary valve arranged on a primary fuel path and a secondary valve arranged on a secondary fuel path, the primary fuel path and the secondary fuel path branching downstream of the primary valve, and an inner body in which the secondary valve slides and which delimits the primary path, the secondary path comprising a central cavity of the secondary valve and at least one hole passing radially through the secondary valve between its periphery and the central cavity, characterized in that it comprises at least one orifice passing through the inner body between the primary fuel path and the secondary valve and opening into the hole when the secondary valve is in the closed position.

In order to achieve perfect enrichment of only the primary flow, it is advantageous if the orifice passing through the inner body opens into an end portion of the hole, in a direction towards the upstream end of the secondary fuel path.

In many customary injectors, however, the piercing of the orifice will produce an excessive primary flow. It will then be useful to replace, over part of its length, the annular portion of the primary flow path with another orifice which can be calibrated to the required diameter.

BRIEF DESCRIPTION OF THE DRAWINGS

Other characteristics and advantages of the invention will become apparent from the following detailed description, particularly when considered in conjunction with the drawings in which.

DETAILED DESCRIPTION OF THE PREFERRED EMBODIMENTS

The invention will now be described in connection with FIGS. 1 and 2, which show an injector according to the invention in states with the primary flow alone and with the primary flow and secondary flow, respectively.

Figure 1:
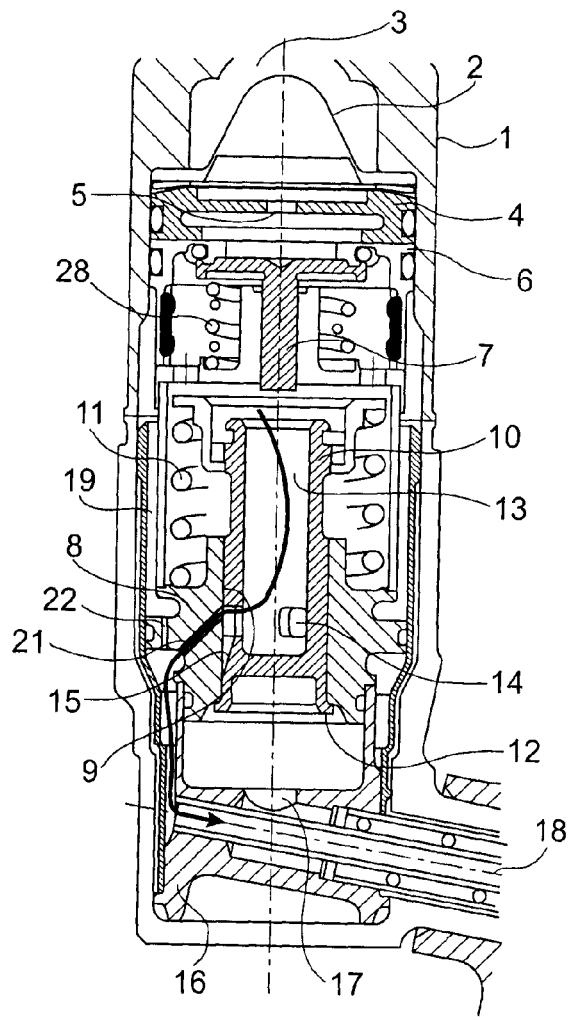
FIG. 1 shows a cross-section view of the injector according to an exemplary embodiment of the present invention with the primary flow alone.
Figure 2:
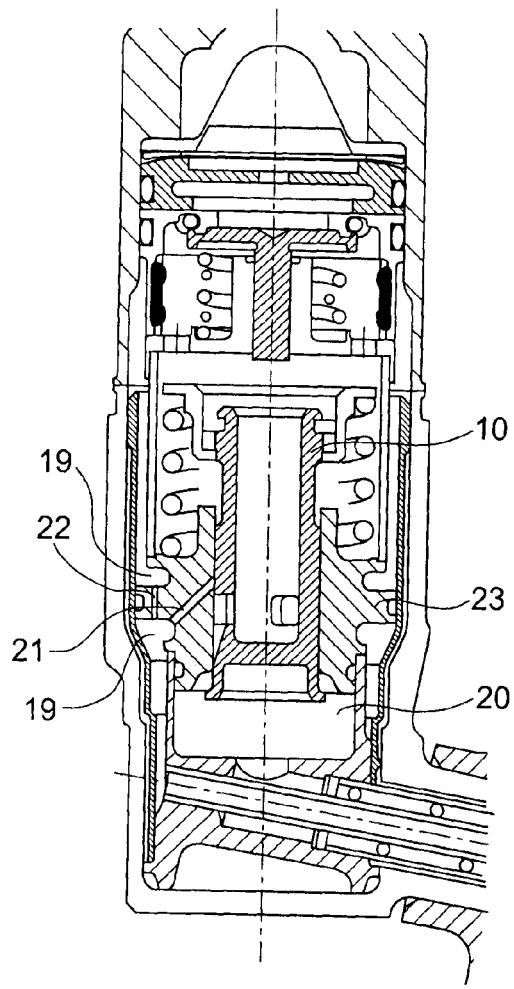
FIG. 2 shows a cross-section view of the injector according to the embodiment of FIG. 1, with the primary flow and secondary flow.

The injector in FIGS. 1 and 2 comprises a cylindrical outer bushing 1 which is hollowed out in places between its two end faces. It contains at the upstream end a strainer-type fuel filter 2 and opens via a fuel inlet orifice 3. The fuel filter 2 bears against a diaphragm 4 with a central orifice 5 which is designed to regulate the flow of fuel in the face of size variations produced during manufacture, according to the teaching of French patent 2 832 492 already cited at the start of this text. A bearing seat 6 for a primary valve 7 extends further downstream in the outer bushing 1. A weak spring 28 biases the primary valve 7 against the seat 6 towards the upstream end of the injector. When the force of the spring 8 is overcome by the pressure of the fuel, the primary valve 7 moves downstream and allows the fuel to pass around it.

The outer bushing 1 also comprises an inner body 8 with a piercing 9 in which there slides a secondary valve 10 which is biased by a spring 11 towards the upstream end as far as a stop position, which can be produced by a collar 12 of the secondary valve 10 which is located at the downstream end and which bears against a corresponding seat portion of the inner body 8. The secondary valve 10 comprises a central cavity 13, although this does not pass all the way through it, and holes 14 of radial orientation which allow the central cavity 13 to communicate with the peripheral surface of the secondary valve 10 and which open in front of the wall of the piercing 9 of the inner body 8. Slots 15 are cut on the secondary valve 10 so as to extend the holes 14 towards the downstream end in order to give the desired fuel flow in the secondary regime as a function of its pressure and the degree of closing of the secondary valve 10.

The downstream end of the injector comprises a system of concentric conduits, the end of which penetrates into the outer bushing 1. A downstream body 16 is housed therein and connects to the inner body 8 already mentioned. The downstream body 16 is pierced by a secondary fuel discharge conduit 17, in the centre of which there is a primary fuel discharge conduit 18.

After having passed the primary valve 7, the fuel takes a primary flow path which passes around the primary valve 7 and then around the inner body 8, into an annular slot 19 located between the inner body and the outer bushing 1, and then around the downstream body 16 into an extension of this slot and finishing in the primary discharge conduit 18. The fuel also flows around the secondary valve 10 and in its central cavity 13, and it weighs against the secondary valve but does not displace it until it has reached a higher pressure. The state shown in FIG. 2 is then reached: the holes 14 or the slots 15 meet the end of the piercing 9 of the inner body 10 and a secondary flow circuit is opened up which is established through the central cavity 13, the holes 14 and the slots 15, and a chamber 20 formed by the downstream body 16 below the inner body 8; the fuel finally reaches the secondary flow conduit 17.

The characteristic elements of the invention will now be considered. An orifice 21 is pierced through the inner body 8 and extends from one of the holes 14 to the annular slot 19 in the state shown in FIG. 1. The primary fuel flow path therefore comprises a branching which passes through the central cavity 13 and the orifice 21 and gives rise to the desired enrichment in this regime. It must be emphasized that the orifice 21 opens immediately downstream of a solid portion of the secondary valve 10 in this position in which it rests against its seat. Thus, as shown clearly in FIG. 2, the orifice 21 is closed off by the secondary valve 10 as soon as it is displaced when the secondary flow is established, so that the enrichment then ceases.

Contrary to a previous design, the annular slot 19 is interrupted by a collar 23 of the inner body 8 which extends as far as the outer bushing 1; the primary fuel flow path is re-established by an orifice 22 passing through this collar 23 and joining the two portions of the annular slot 19; it is possible to calibrate said orifice to a very precise diameter, just like the orifice 21, so as to perfectly control the primary fuel flow.

Figure 3:
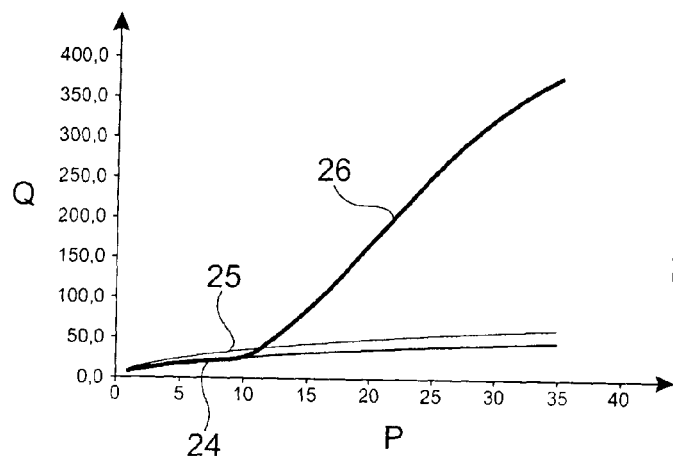
FIG. 3 shows a flow curve obtained as a function of fuel pressure for an exemplary embodiment of the present invention.

FIG. 3 shows the flow curve obtained as a function of the pressure of the fuel, with a first portion 24 representative of the flow rate in the primary regime obtained with the known injection, a second portion 25 representative of the primary flow obtained with the injector of the invention, and a portion 26 which is obtained in the secondary flow regime and which, according to the object of the invention, is identical for the new injector and for the old injector.

The invention claimed is:

1. A two-stage fuel injector comprising:
two valves arranged in series and biased towards closed positions, said two valves including a primary valve arranged on a primary fuel path and a secondary valve arranged on a secondary fuel path, the primary fuel path and the secondary fuel path branching downstream of the primary valve,
inner body in which the secondary valve slides and which delimits the primary path, the primary path surrounding the inner body,
wherein the secondary path comprises a central cavity of the secondary valve and at least one hole passing radially through the secondary valve between a periphery and the central cavity,
at least one orifice passing through the inner body between the primary fuel path and the secondary valve and opening into the hole and immediately downstream a solid portion of the secondary valve when the secondary valve is in the closed position, and
wherein said orifice is closed off by the secondary valve as soon as said secondary valve is displaced when the secondary flow is established so that an enrichment of a mixture delivered by said injector ceases.

2. A two-stage fuel injector according to claim 1, wherein the primary circuit comprises at least one orifice passing through a collar of the inner body which extends as far as a peripheral bushing of the injector.

3. A combustion chamber equipped with at least one adjuster according to claim 1.

4. A gas turbine comprising a combustion chamber according to claim 3.

5. A two-stage fuel injector according to claim 1, wherein said primary flow path passes around said primary valve and then around the inner body and into an annular slot located between the inner body and an outer bushing for said injector, and wherein said annular slot is interrupted by a collar of the inner body which extends as far as the outer bushing.

6. A two-stage fuel injector according to claim 5, wherein the primary fuel flow path is re-established by an orifice passing through said collar and joining two portions of the annular slot.

* * * * *

UNITED STATES PATENT AND TRADEMARK OFFICE
CERTIFICATE OF CORRECTION

PATENT NO. : 7,896,260 B2
APPLICATION NO. : 12/016480
DATED : March 1, 2011
INVENTOR(S) : José Roland Rodrigues et al.

It is certified that error appears in the above-identified patent and that said Letters Patent is hereby corrected as shown below:

In column 4, line 9, before "inner" insert --an--.

Signed and Sealed this
Seventh Day of June, 2011

David J. Kappos
*Director of the United States Patent and Trademark Office*